Oct. 22, 1946.  C. LUND  2,409,772
ADJUSTABLE HARNESS CLIP
Filed May 13, 1944
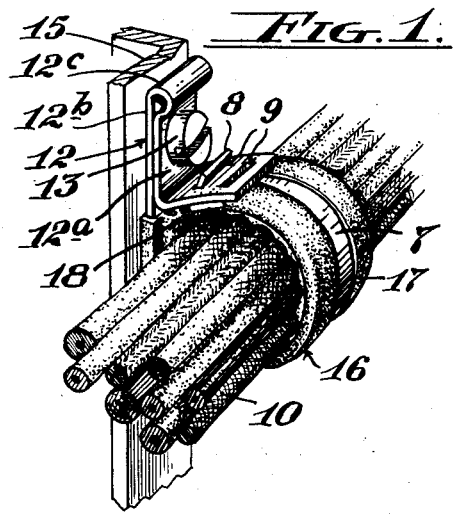
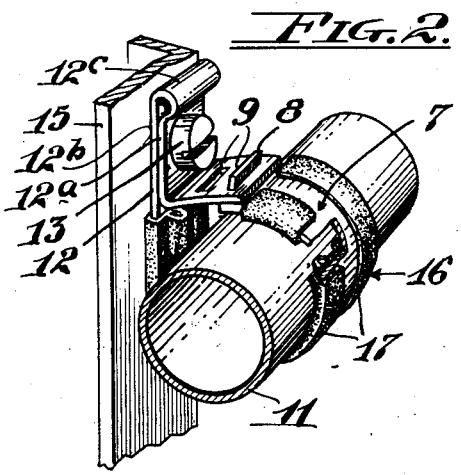
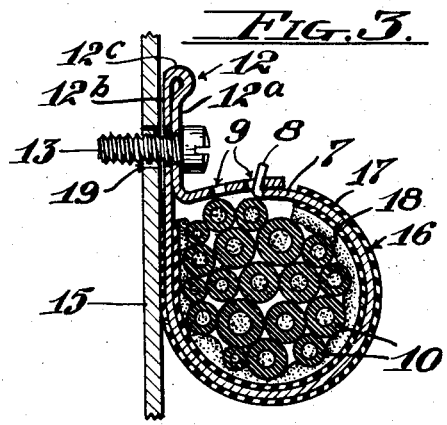
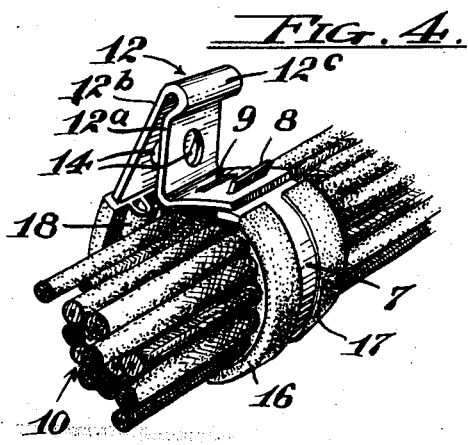
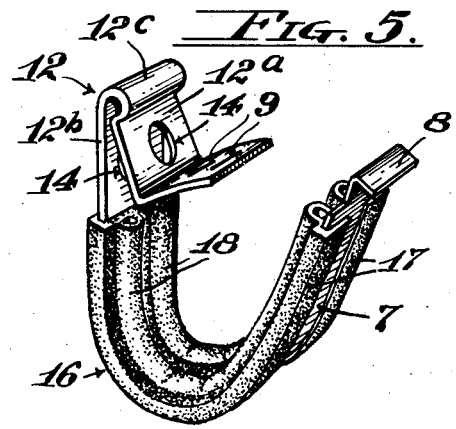
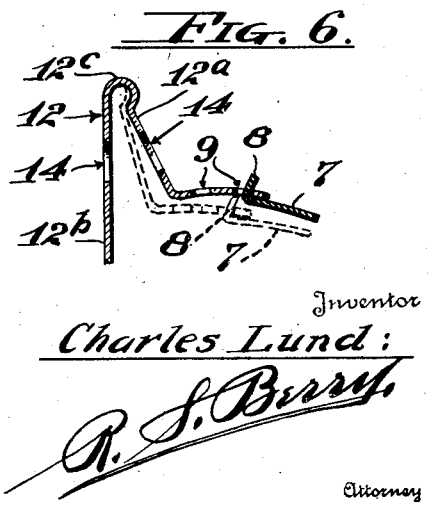
Inventor
Charles Lund:
By R. S. Berry
Attorney Patented Oct. 22, 1946

2,409,772

UNITED STATES PATENT OFFICE 2,409,772

ADJUSTABLE HARNESS CLIP

Charles Lund, Burbank, Calif., assignor to Adel Precision Products Corp., a corporation of California Application May 13, 1944, Serial No. 535,534

2 Claims. (Cl. 248—74)

This invention relates to clips which are designed to be attached to a support and to surround and hold wires or conduits in the desired position relative to the support particularly in aircraft wherein the various electrical conductor lines and conduit lines are secured at spaced point to structural parts of the aircraft to safeguard such lines against chafing, damage and derangement and to conserve space.

An object of the present invention is to provide a simple, light-weight and inexpensive clip of the character described which may be quickly and easily installed and after installation on a support therefor, affords a ready insertion and removal of wires or a conduit, without removing the clip from the support.

Another object of this invention is to provide an adjustable conduit or wire supporting clip which before or after installation may be readily adjusted to make it larger or smaller so that a greater or lesser number of wires or conduits of different diameters may be readily accommodated and effectively gripped and held thereby, it being unnecessary to remove the clip from the support to adjust it to different sizes.

A further object is to provide a clip such as described which may be readily assembled with the wires or conduit therein before installation on the support, thereby facilitating sub-assembly installations of wires and clips as is the present practice in aircraft construction.

Another object of my invention is to provide a normally open and deformable spring clip of the character described having end-carried fastening means for detachably hooking the ends of the clip together and provided between its ends with a deformable apertured attaching ear formed integral with the clip in such manner that when a screw or bolt inserted through the ear to secure the clip to support it, is tightened, the ear will be deformed so as to deform and constrict the clip and tightly clamp it around the wires or conduit with the fastening means more tightly and effectively engaged to prevent accidental opening of the clip.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention as it would appear when installed and adjusted to its smallest size;

Fig. 2 is a fragmentary perspective view of the clip as it would appear when installed to support a conduit, with the end fastening means adjusted to increase the capacity of the clip compared to Fig. 1;

Fig. 3 is a vertical sectional view of the clip as installed and adjusted to larger capacity compared to Fig. 1;

Fig. 4 is a perspective view showing a sub-assembly of the clip and wires as before mounting the clip on a support;

Fig. 5 is a perspective view of the clip when open and before placing the wires or conduit therein and mounting the clip on the support;

Fig. 6 is a fragmentary sectional view showing how the ends are hooked together.

As shown in the accompanying drawing my improved clip is made of a spring metal strap formed into an open loop or band 7 which is normally substantially U-shaped, and provided at one end with an outwardly extending hook 8 adapted to be engaged in any one of a plurality of slots or openings 9, which are spaced apart circumferentially of the loop, formed in the other end of the loop whereby ends of the loop may be hooked together to close the loop and make it of larger or smaller capacity for holding wires 10 as shown in Figs. 1, 3 and 4 or a conduit 11 as shown in Fig. 2.

As here provided the strap of which the loop 7 is formed, or in other words the loop, is formed with a doubled and deformable attaching ear 12 of an inverted V-shape, intermediate the ends thereof. The legs 12a and 12b forming this ear are joined at their outer ends by a bight portion 12c curved on such a radius as to prevent weakening or breaking of the metal, when the legs, which extend divergently toward the loop, are forced together as shown in Figs. 1 and 2. This formation makes a gap in the loop between its ends and makes the loop deformable, but this gap is closed when the legs 12a and 12b are forced together by means of a threaded fastening 13 inserted through openings 14 in said legs, to secure the clip to a support 15. In this connection it should be noted that the leg 12b and the portion of the loop contiguous the leg are flat and straight to provide a long and effective bearing or seating surface against the support 15. It will be seen that said attaching ear consists of an outwardly directed and then doubled back looped portion of the main loop 7.

As here shown a cushion strip 16 of soft rubber or the like is mounted on the loop to provide a cushioned seat for the wires or conduit to protect them from wear and damage and yet afford a tight clamping thereof. The cushion has rebent flanges 17 to hold it on the loop and may as here shown be provided with tubular cushioning ribs 18 extending lengthwise thereof.

The clip is normally open and appears as shown in Fig. 5 with the hook end extended whereby the wires or the conduit may be readily placed therein. After the wires or conduits are mounted in the loop the ends thereof are forced toward one another so that the hook 8 passes under the end having the openings 9 therein and will snap into the selected one of said openings to hook the ends together as shown in Figs. 4 and 6. When thus held on the wires, the loop is not fully constricted or tightly clamped, but will remain in position on the wires as shown in Fig. 4 with the hook 8 subject to disengagement from the other end of the loop upon depressing the end carrying the hook. When the hook is disengaged the loop will spring open somewhat as shown in Fig. 5 thereby affording insertion of an additional wire, or a wire replacement or a removal of wires.

Assuming that a sub-assembly is provided as shown in Fig. 4 it is seen that the clip may be readily mounted on the support 15 by inserting the threaded fastenings 13 through the openings 14 in the legs 12a and 12b and turning said fastening in the threaded opening 19 in the support 15, or in a nut (not shown) so that the leg 12a will be flexed and forced inwardly toward the leg 12b which then rests against the support as shown in Figs. 1, 2 and 3. The leg 12a in being forced against leg 12b fulcrums or bends at the bight portion 12c of the deformable doubled ear 12 and in so moving operates through the hooked together ends of the loop to constrict the loop and tightly clamp it around the wires or conduit and at the same time put the hooked ends under such tension as to insure that they will remain tightly hooked against accidental release.

While in some instances it is possible to depress the hook end of the loop after complete installation of the clips to disengage the hooked ends and open the loop especially where a readily compressible bundle of wires is clamped in the loop, if on the other hand the wires are clamped so tightly that the hooked end cannot be depressed or the metal conduit 11 is held in the installed clip, the screw or fastening 13 may be loosened so that the leg 12a will spring away from leg 12b and allow the loop to expand sufficiently to permit of depression of the hook end to disengage the hook and open the clip, it being unnecessary at all events to remove the fastening and the clip from the support.

The several spaced openings 9 permit of varying the loop 7 to effective diameter to hold bundles containing different numbers of wires or to accommodate conduits of different diameters.

The loop 7, when the clip is installed, is deformed so that it takes a substantially circular form as shown in Fig. 3 but it is obvious that it may be of any form provided it will embrace or enclose the conduits or wires and provide for detachably hooking the free ends and have the deformable ear as here shown.

It is now apparent that my clip will make it unnecessary to use considerable force in initially hooking the ends of the loop together as would be required to insure an effective clamping action if no provision was made for the tightening action after hooking the ends together as by use of the deformable ear herewith shown and described. Without this automatic tightening of the loop after the ends are hooked together and which is effected in the action of screwing in the screw or bolt for fastening the clip to the support, it would be difficult if not impossible to tightly and effectively clamp the clip or wires or a conduit and yet make the hooked ends detachable for opening the clip, when a compact and substantially non-yielding wire bundle or a nonyielding conduit is clamped in the loop.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a spring metal strap formed into a normally open loop having its free ends spaced apart whereby wires or a conduit may be mounted therein, fastening elements on said ends of the loop for detachably connecting said ends together to close the loop, and an inverted V-shaped ear formed integral with the loop and rendering the same deformable, said ear having openings in the opposed legs thereof for reception of a screw threaded fastening for securing the ear to a support and being deformed so that the legs move into substantial parallelism and thereby constrict and clamp the loop around the wires or conduit when the fastening is tightened to complete the installation of the clip.

2. In a clip for supporting wires or a conduit, a spring metal strap formed into a normally open loop having its free ends spaced apart whereby wires or a conduit may be mounted therein, fastening elements on said ends of the loop for detachably connecting said ends together to close the loop, and an inverted V-shaped ear formed integral with the loop and rendering the same deformable, said ear having openings in the opposed legs thereof for reception of a screw threaded fastening for securing the ear to a support and being deformed so that the legs move into substantial parallelism and thereby constrict and clamp the loop around the wires or conduit when the fastening is tightened to complete the installation of the clip, said fastening elements including an opening in one of said ends and an outwardly turned hook on the other of said ends adapted to hook into said opening to hold the ends in tensioned contact with one another when initially hooked together as well as when the loop is being and after it has been constricted to clamp it tightly around the conduit or wires.

CHARLES LUND.